United States Patent
Tian

(10) Patent No.: US 11,019,496 B2
(45) Date of Patent: May 25, 2021

(54) METHOD AND ELECTRONIC DEVICE FOR IDENTIFYING A PSEUDO WIRELESS ACCESS POINT

(71) Applicant: YULONG COMPUTER TELECOMMUNICATION SCIENTIFIC (SHENZHEN) CO., LTD., Shenzhen (CN)

(72) Inventor: Yong-Sheng Tian, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 151 days.

(21) Appl. No.: 16/345,352

(22) PCT Filed: Dec. 30, 2016

(86) PCT No.: PCT/CN2016/113631
§ 371 (c)(1),
(2) Date: Apr. 26, 2019

(87) PCT Pub. No.: WO2018/076539
PCT Pub. Date: May 3, 2018

(65) Prior Publication Data
US 2019/0251285 A1 Aug. 15, 2019

(30) Foreign Application Priority Data
Oct. 31, 2016 (CN) .......................... 201610932098.3

(51) Int. Cl.
*G06F 7/04* (2006.01)
*H04W 12/122* (2021.01)
(Continued)

(52) U.S. Cl.
CPC ...... *H04W 12/122* (2021.01); *G06F 21/6245* (2013.01); *H04W 12/02* (2013.01);
(Continued)

(58) Field of Classification Search
CPC .............. G06F 21/554; G06F 21/6245; H04W 12/001; H04W 12/02; H04W 12/1202;
(Continued)

(56) References Cited

U.S. PATENT DOCUMENTS 8,069,483 B1 * 11/2011 Matlock .............. H04W 12/126
726/23
8,788,407 B1 * 7/2014 Singh ................... G06Q 40/123
705/38
(Continued)

FOREIGN PATENT DOCUMENTS

CN 1623144 A 6/2005
CN 1737722 A 2/2006
(Continued)

*Primary Examiner* — Gary S Gracia
(74) *Attorney, Agent, or Firm* — ScienBiziP, P.C.

(57) ABSTRACT

A method for identifying a pseudo wireless access point, applied to an electronic device, includes: determining whether an abnormal file operation is detected, when the electronic device is connected to a wireless network through a wireless access point; determining the wireless access point to be a pseudo wireless access point, when the abnormal file operation is detected; and executing an early warning instruction. A system for identifying a pseudo wireless access point is also provided. The present disclosure can timely discover a phishing wireless access point and prevent loss of a user's privacy and property.

20 Claims, 3 Drawing Sheets

Determining whether an abnormal file operation is detected, when an electronic device is connected to a wireless network through a wireless access point — S10

Determining the wireless access point to be a pseudo wireless access point, when the abnormal file operation is detected — S11

Executing an early warning instruction — S12

(51) Int. Cl.
*G06F 21/62* (2013.01)
*H04W 76/30* (2018.01)
*H04W 12/02* (2009.01)
*H04W 24/00* (2009.01)
*H04W 12/03* (2021.01)
*H04W 12/126* (2021.01)
*H04N 7/16* (2011.01)
*H04W 88/08* (2009.01)

(52) U.S. Cl.
CPC ......... *H04W 12/03* (2021.01); *H04W 12/126* (2021.01); *H04W 24/00* (2013.01); *H04W 76/30* (2018.02); *H04W 88/08* (2013.01)

(58) Field of Classification Search
CPC ......... H04W 12/1204; H04W 12/1206; H04W 24/00; H04W 76/30; H04W 88/08
See application file for complete search history.

(56) References Cited

U.S. PATENT DOCUMENTS

| | | | | |
|---|---|---|---|---|
| 9,432,402 | B1* | 8/2016 | McKeeman | G06F 16/13 |
| 2003/0233567 | A1* | 12/2003 | Lynn | H04L 63/1458 726/23 |
| 2005/0113090 | A1* | 5/2005 | Sharony | H04W 12/122 455/436 |
| 2006/0259957 | A1* | 11/2006 | Tam | G06Q 50/01 726/3 |
| 2007/0039043 | A1* | 2/2007 | Garskof | G06F 21/41 726/8 |
| 2007/0186276 | A1* | 8/2007 | McRae | H04L 63/1441 726/4 |
| 2008/0022389 | A1* | 1/2008 | Calcev | H04W 40/28 726/14 |
| 2009/0094357 | A1* | 4/2009 | Keohane | H04L 45/00 709/224 |
| 2010/0074112 | A1* | 3/2010 | Derr | H04L 41/12 370/232 |
| 2012/0096519 | A1* | 4/2012 | Alanara | H04W 12/08 726/3 |
| 2013/0007850 | A1* | 1/2013 | Lambert | H04L 63/126 726/4 |
| 2013/0097710 | A1* | 4/2013 | Basavapatna | H04L 63/1433 726/25 |
| 2014/0325615 | A1* | 10/2014 | Scahill | H04W 12/122 726/4 |
| 2016/0112871 | A1* | 4/2016 | White | H04W 12/06 726/4 |
| 2016/0183093 | A1* | 6/2016 | Vaughn | H04W 24/04 455/528 |

FOREIGN PATENT DOCUMENTS

| | | |
|---|---|---|
| CN | 102273174 A | 12/2011 |
| CN | 103891331 A | 6/2014 |
| CN | 105554762 A | 5/2016 |
| CN | 105636048 A | 6/2016 |
| CN | 105704718 A | 6/2016 |
| WO | 2013046849 A1 | 4/2013 |

* cited by examiner

METHOD AND ELECTRONIC DEVICE FOR IDENTIFYING A PSEUDO WIRELESS ACCESS POINT

This application claims priority of Chinese Patent Application No. 201610932098.3, entitled "method and system for identifying a pseudo wireless access point," filed on Oct. 31, 2016 in the China National Intellectual Property Administration (CNIPA), the entire contents of which are incorporated by reference herein.

FIELD

The embodiments of the present disclosure relates to a technical field of wireless network, specifically a method and a system for identifying a pseudo wireless access point.

BACKGROUND

Many electronic devices are now configured with wireless access point options. Users can connect to a wireless access point hotspot to browse a network anytime and anywhere. However, people with ulterior motives can establish a phishing wireless access point through wireless access point configurations in an electronic device to induce the users to connect, thereby stealing the users' personal privacy, such as acquiring photos, contacts, information related to financial applications, and the like, in the electronic device. Generally, the users are unable to detect it. The users can find that it has been connected to the phishing wireless access point only after money like online banking is illegally transferred.

SUMMARY

A method for identifying a pseudo wireless access point, which is applied to an electronic device, the method includes:

When the electronic device is connected to a wireless network through a wireless access point, determining whether an abnormal file operation is detected;

When the abnormal file operation is detected, determining the wireless access point to be a pseudo wireless access point; and Executing an early warning instruction.

According to an optional embodiment of the present disclosure, the file operations include one or more of the following: operations corresponding to a target file and a new file creation operation. The target file includes a file related to user privacy or property security. The operation corresponding to the target file includes any one or more of the following: a modification operation, a read operation, and a writing operation on the target file.

According to the optional embodiment of the present disclosure, the abnormal operation includes one or more of the following:

An operation to modify permission setting data corresponding to the target file;

A read operation or a writing operation for reading or writing the target file, which has a file size larger than or equal to a preset value;

A new file creation operation for generating a new file that does not meet preset naming rules.

According to the optional embodiment of the present disclosure, the early warning instruction includes one or more of the following:

Logging out of logged-in accounts of all applications in the electronic device;

Freezing operations associated with the target file;

Disconnecting from the wireless access point;

Prompting a user that the wireless access point is the pseudo wireless access point;

Prohibiting any operation from accessing a secure digital card in the electronic device.

A system for identifying a pseudo wireless access point, the system running in an electronic device, the system includes:

A detection module configured to determine whether an abnormal file operation is detected, when the electronic device is connected to a wireless network through a wireless access point;

A determination module configured to determine the wireless access point to be a pseudo wireless access point, when the abnormal file operation is detected; and An early warning module configured to execute an early warning instruction.

According to an optional embodiment of the present disclosure, the file operations include one or more of the following: operations corresponding to a target file and a new file creation operation. The target file includes a file related to user privacy or property security. The operation corresponding to the target file includes any one or more of the following: a modification operation, a read operation, and a writing operation on the target file.

According to the optional embodiment of the present disclosure, the abnormal operation includes one or more of the following:

An operation to modify permission setting data corresponding to the target file;

A read operation or a writing operation for reading or writing the target file, which has a size larger than or equal to a preset value;

A new file creation operation for generating a new file that does not meet preset naming rules.

According to the optional embodiment of the present disclosure, the early warning instruction includes one or more of the following:

Logging out of logged-in accounts of all applications in the electronic device;

Freezing operations associated with the target file;

Disconnecting from the wireless access point;

Prompting a user that the wireless access point is the pseudo wireless access point;

Prohibiting any operation from accessing a secure digital card in the electronic device.

| IDENTIFICATION OF ELEMENTS | |
| --- | --- |
| An electronic device | 1 |
| A storage device | 12 |
| Processing equipment | 13 |

-continued

| IDENTIFICATION OF ELEMENTS | |
|---|---|
| A system for identifying a pseudo wireless access point | 11 |
| A detection module | 100 |
| A determination module | 101 |
| An early warning module | 102 |

DETAILED DESCRIPTION

In order to make objects, technical solutions and advantages of a present disclosure more comprehensible, the present disclosure is described in detail below with references to drawings and specific embodiments.

Figure 1:
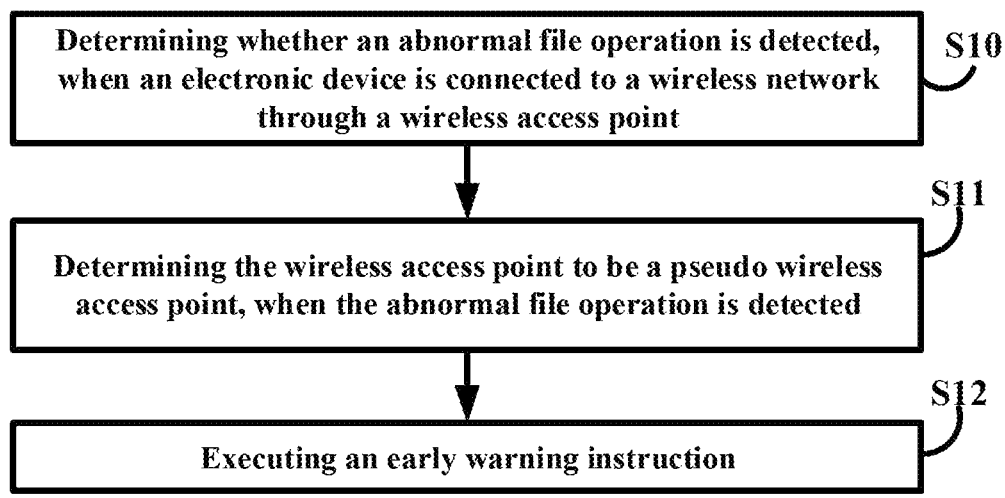
FIG. 1 is a flowchart diagram of a method for identifying a pseudo wireless access point in an optional embodiment of the present disclosure.

As shown in FIG. 1, FIG. 1 is a flowchart diagram of a method for identifying a pseudo wireless access point in an optional embodiment of the present disclosure. According to different requirements, a sequence of steps in the flowchart diagram can be changed, and some steps can be omitted.

Optionally, the method for identifying a pseudo wireless access point in the embodiment of the present disclosure can be applied to a plurality of electronic devices. The electronic devices are devices capable of automatically performing numerical calculation and/or information processing according to an instruction configured or stored in advance, and hardware of the electronic devices can include but is not limited to a microprocessor, an Application Specific Integrated Circuit (ASIC), a Field-Programmable Gate Array (FPGA), a Digital Signal Processor (DSP), and an embedded device, etc.

The electronic devices can also be any electronic product that can interact with users, such as a personal computer, a tablet computer, a smart phone, a Personal Digital Assistant (PDA), a game machine, an Interactive Network Television. (IPTV), and a smart wearable devices, etc.

Step 10, when an electronic device is connected to a wireless network through a wireless access point, the electronic device determines whether an abnormal file operation is detected.

In one embodiment of the present disclosure, the electronic device includes various types of files, such as pictures, videos, installation files of various applications, various configuration files, and the like. The wireless access point can include, but is not limited to, a Wi-Fi™ access point.

In one embodiment of the present disclosure, the file operations include one or more of the following: operations corresponding to a target file and a new file creation operation. The target file includes files related to user privacy or property security. The target file includes, but is not limited to, pictures, videos, cookie files, application configuration files, and the like. The target file can be one or more. The operation corresponding to the target file includes any one or more of the following: a modification operation, a read operation, and a writing operation on the target file, and the like.

In one embodiment of the present disclosure, the electronic device traverses file operations according to a preset time interval to determine whether an abnormal file operation is detected.

In one embodiment of the present disclosure, it can be determined that an abnormal file operation is detected when a modification operation, a read operation or a writing operation on a target file is abnormal, or a new file generated by a new file creation operation is abnormal.

Step 11, when the abnormal file operation is detected, the electronic device determines the wireless access point to be a pseudo wireless access point.

In one embodiment of the present disclosure, the abnormal operation includes one or more of the following:

(1) An operation to modify permission setting data corresponding to the target file.

In one embodiment of the present disclosure, for example, an operation to modify permission setting data corresponding to the target file by a malicious program. The malicious program generally refers to a program written with an attack intention. The malicious program mainly includes trapdoors, logic bombs, Trojan horses, worms, bacteria, viruses, and the like. The permission setting data includes access rights, read permissions, editing permissions, modifying permissions, and the like.

(2) A read operation or a writing operation for reading or writing the target file, which has a file size larger than or equal to a preset value.

In one embodiment of the present disclosure, when the size of the target file read or written is larger than or equal to the preset value, it is indicated that a plurality of target files are being read or written. The user's privacy and property can be threatened.

(3) A new file creation operation for generating a new file, which does not meet preset naming rules. The preset naming rules are configured according to user habits and/or according to system settings of the electronic device.

Therefore, when the electronic device detects that the file operations have one or more of above operations, the electronic device determines that the file operations includes one or more abnormal operation.

Step 12, the electronic device executes an early warning instruction.

In one embodiment of the present disclosure, the electronic device executes an early warning instruction, which can include one or more of the following:

(1) Logging out of logged-in accounts of all applications in the electronic device.

(2) Freezing operations associated with the target file. For example, the read operation or the writing operation, and a copy operation, and the like.

In one embodiment of the present disclosure, after freezing the operations associated with the target file, when receiving an unfreezing instruction for the operations associated with the target file from the user, the operations associated with the target file can be unfrozen.

(3) Disconnecting from the wireless access point.

In one embodiment of the present disclosure, the electronic device first logs out of the logged-in accounts of all the applications in the electronic device, and then the electronic device disconnects from the wireless access point. If the electronic device firstly disconnects from the wireless access point, and then the electronic device logs out of the logged-in accounts of all the applications in the electronic device, cached network data cannot be emptied, and it can cause the malicious program to continue to manipulate the electronic device.

(4) Prompting a user that the wireless access point is the pseudo wireless access point.

In one embodiment of the present disclosure, the wireless access point can be prompted to be the pseudo wireless access point by means of voice, a vibration, an interface, and the like.

(5) Prohibiting any operation from accessing a Secure Digital (SD) card in the electronic device.

The present disclosure determines whether the file operation includes the abnormal operation. When the file operation includes the abnormal operation, the wireless access point accessed by the electronic device is determined to be the pseudo wireless access point, and a preset early warning instruction is executed. Therefore, the present disclosure can timely discover the phishing wireless access point and prevent loss of the user's privacy and property.

Figure 2:
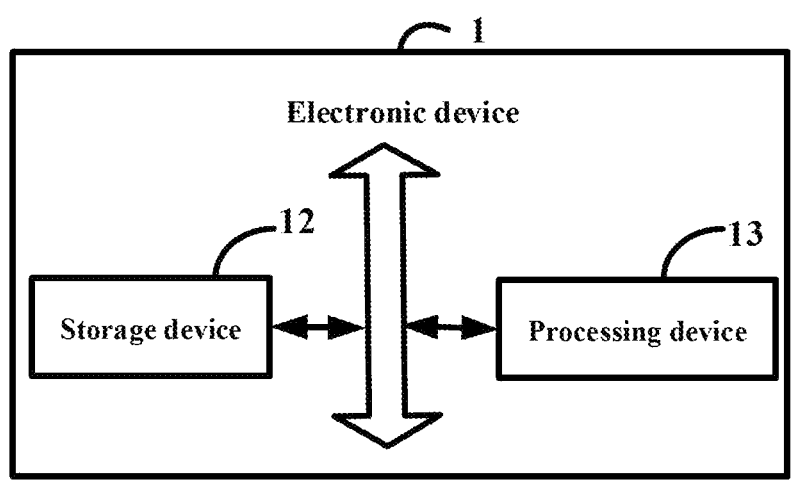
FIG. 2 is a structural diagram of an electronic device according to an optional embodiment of a method for identifying a pseudo wireless access point.

As shown in FIG. 2, FIG. 2 is a structural diagram of an electronic device according to an optional embodiment of a method for identifying a pseudo wireless access point. An electronic device 1 includes a storage device 12 and a processing device 13.

The electronic device 1 further includes, but is not limited to any electronic product that can interact with a user through a keyboard, a mouse, a remote controller, a touch panel, or a voice control device. For example, a personal computer, a tablet computer, a smart phone, a Personal Digital Assistant (PDA), a game console, an Internet Protocol Television (IPTV), a smart wearable devices, and the like. The network to which the electronic device 1 is located includes, but is not limited to, the Internet, a wide area network, a metropolitan area network, a local area network, a virtual private network (VPN), and the like.

The storage device 12 is configured to store a program of a method for identifying a pseudo wireless access point and various data. The storage device 12 realizes high speed and automatic access of the program or data during operations on the electronic device 1. The storage device 12 can be an external storage device and/or an internal storage device of the electronic device 1. Moreover, the storage device 12 can be a circuit having a storage function without a physical form in an integrated circuit, such as a Random-Access Memory (RAM), a First In First Out (FIFO), or the like. Alternatively, the storage device 12 can also be a storage device having the physical form, such as a memory stick, a Trans-flash Card (TF card), or the like.

The processing device 13 is also called as a Central Processing Unit (CPU). The processing device 13 can be a very large-scale integrated circuit, and the processing device 13 is a computing core and a control unit of the electronic device 1. The processing device 13 can execute an operating system of the electronic device 1 and various installed applications, program codes, and the like, such as a system 11 for identifying a pseudo wireless access point.

Figure 3:
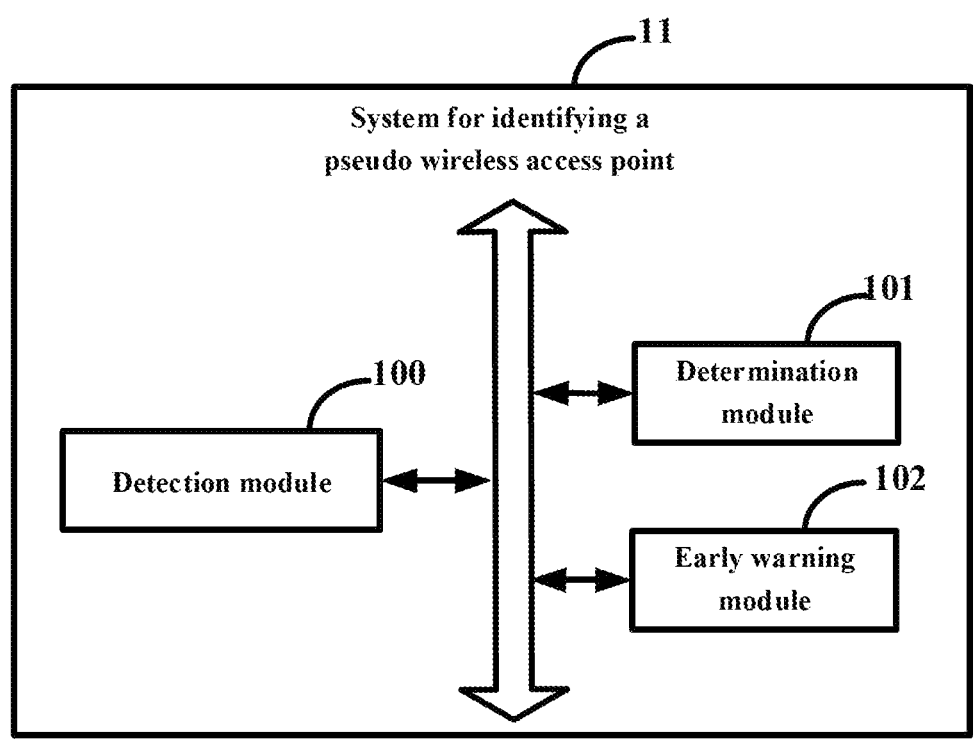
FIG. 3 is a functional block diagram of a system for identifying a pseudo wireless access point in an embodiment of the present disclosure.

As shown in FIG. 3, FIG. 3 is a functional block diagram of a system for identifying a pseudo wireless access point in an embodiment of the present disclosure. The system for identifying a pseudo wireless access point 11 includes a detection module 100, a determination module 101, and an early warning module 102. The modules in the present disclosure refer to a series of computer program segments that can be executed by the processing device 13 and that are capable of performing fixed functions. The modules are stored in the storage device 12. In an embodiment, functions of respective modules can be described in detail in subsequent embodiments.

When an electronic device 1 is connected to a wireless network through a wireless access point, the detection module 100 determines whether an abnormal file operation is detected.

In one embodiment of the present disclosure, the electronic device 1 includes various types of files, such as pictures, videos, installation files of various applications, various configuration files, and the like. The wireless access point includes, but is not limited to, a Wi-Fi™ access point.

In one embodiment of the present disclosure, the file operations include one or more of the following: operations corresponding to a target file and a new file creation operation. The target file includes files related to user privacy or property security. The target file includes, but is not limited to, pictures, videos, cookies files, application configuration files, and the like. The target file can be one or more. The operation corresponding to the target file includes any one or more of the following: a modification operation, a read operation, and a writing operation on the target file, and the like.

In one embodiment of the present disclosure, the detection module 100 traverses file operations according to a preset time interval to determine whether an abnormal file operation is detected.

In one embodiment of the present disclosure, the detection module 100 can determine whether an abnormal file operation is detected in a file management folder by determining whether a modification operation, a read operation or a writing operation on a target file is abnormal, or whether a new file generated by a new file creation operation is abnormal.

When the abnormal file operation is detected, the determination module 101 determines the wireless access point to be a pseudo wireless access point.

In one embodiment of the present disclosure, the abnormal operation includes one or more of the following:

(1) An operation to modify permission setting data corresponding to the target file.

In one embodiment of the present disclosure, for example, an operation to modify permission setting data corresponding to the target file by a malicious program. The malicious program generally refers to a program written with an attack intention. The malicious program mainly includes trapdoors, logic bombs, Trojan horses, worms, bacteria, viruses, and the like. The permission setting data includes access rights, read permissions, editing permissions, modifying permissions, and the like.

(2) A read operation or a writing operation for reading or writing the target file, which has a file size larger than or equal to a preset value.

In one embodiment of the present disclosure, when the size of the target file read or written is larger than or equal to the preset value, it is indicated that a plurality of target files are being read or written. The user's privacy and property can be threatened.

(3) A new file creation operation for generating a new file, which does not meet preset naming rules. The preset naming rules are configured according to user habits and/or according to system settings of the electronic device.

Therefore, when the determination module 101 detects that the file operations have one or more of above operations, the determination module 101 determines that the file operations includes one or more abnormal operation.

The early warning module 102 executes an early warning instruction.

In one embodiment of the present disclosure, the early warning module 102 executes an early warning instruction, includes one or more of the following:

(1) Logging out of logged-in accounts of all applications in the electronic device.

(2) Freezing operations associated with the target file. For example, the read operation or the writing operation, and a copy operation, and the like.

In one embodiment of the present disclosure, after freezing the operations associated with the target file, when receiving an unfreezing instruction for the operations associated with the target file from the user, the operations associated with the target file can be unfrozen.

(3) Disconnecting from the wireless access point.

In one embodiment of the present disclosure, the electronic device first logs out of the logged-in accounts of all the applications in the electronic device, and then the electronic device disconnects from the wireless access point. If the electronic device firstly disconnects from the wireless access point, and then the electronic device logs out of the logged-in accounts of all the applications in the electronic device, cached network data cannot be emptied, and it can cause the malicious program to continue to manipulate the electronic device.

(4) Prompting a user that the wireless access point is the pseudo wireless access point.

In one embodiment of the present disclosure, the wireless access point can be prompted to be the pseudo wireless access point by means of voice, a vibration, an interface, and the like.

(5) Prohibiting any operation from accessing a Secure Digital (SD) card in the electronic device.

The present disclosure determines whether the file operation includes the abnormal operation. When the file operation includes the abnormal operation, the wireless access point accessed by the electronic device is determined to be the pseudo wireless access point, and a preset early warning instruction is executed. Therefore, the present disclosure can timely discover the phishing wireless access point and prevent loss of the user's privacy and property.

The above described integrated units implemented in a form of software function modules can be stored in a computer readable storage medium. The software function modules as described above are stored in a storage medium, and the software function modules include instructions for causing a computer device (e.g., the computer device can be a personal computer, a server, or a network device, etc.) or a processor to perform partial steps of methods in various embodiments of the present disclosure.

Combined with FIG. 1, the storage device 12 in the electronic device 1 stores a plurality of instructions to implement a method for identifying a pseudo wireless access point, and the processing device 13 can execute the plurality of instructions to implement: when an electronic device is connected to a wireless network through a wireless access point, determining whether an abnormal file operation is detected; when the abnormal file operation is detected, determining the wireless access point to be a pseudo wireless access point; and executing an early warning instruction.

According to an optional embodiment of the present disclosure, the file operations include one or more of the following: operations corresponding to a target file and a new file creation operation. The target file includes a file related to user privacy or property security. The operation corresponding to the target file includes any one or more of the following: a modification operation, a read operation, and a writing operation on the target file.

According to the optional embodiment of the present disclosure, the abnormal operation includes one or more of the following:

An operation to modify permission setting data corresponding to the target file;

A read operation or a writing operation for reading or writing the target file, which has a file size larger than or equal to a preset value;

A new file creation operation for generating a new file that does not meet preset naming rules.

According to the optional embodiment of the present disclosure, the early warning instruction includes one or more of the following:

Logging out of logged-in accounts of all applications in the electronic device;

Freezing operations associated with the target file;

Disconnecting from the wireless access point;

Prompting a user that the wireless access point is the pseudo wireless access point;

Prohibiting any operation from accessing a secure digital card in the electronic device.

Specifically, a specific implementation method of the processing device 13 of above instructions can refer to descriptions of relevant steps in the corresponding embodiment in FIG. 1, and details are not repeated herein. In some embodiments provided by the present disclosure, it should be understood that a disclosed system, a device, and a method can be implemented in other manners. For example, device embodiments described above are illustrative. For example, a division of the modules is only a logical function division, and an actual implementation can be in another division manner.

The modules described as separate components can or cannot be physically separated, and components displayed as modules can or cannot be physical units. That is, the modules and the components can be located in one place, or can be distributed to a plurality of network units. Some or all of the modules can be selected according to actual requirements to achieve purposes of solutions of the embodiments.

In addition, each functional module in each embodiment of the present disclosure can be integrated into one processing unit, or each unit can exist physically separately, or two or more units can be integrated into one unit. An integrated unit above can be implemented in the form of hardware or in a form of hardware with software function modules.

It is apparent to those skilled in a technical field that the present disclosure is not limited to details of the above described exemplary embodiments. The present disclosure can be embodied in other specific forms without departing from spirits or essential characteristics of the present disclosure. Therefore, from any point of view, present embodiments are considered as illustrative and not restrictive, and scope of the present disclosure is limited by appended claims instead but not stated above. All changes in meanings and scopes of equivalent elements are included in the present disclosure. Any accompanying drawings in the claims should not be construed as limiting the claims. In addition, it is to be understood that the word 'comprising' does not exclude other elements or steps, singular or plural. A plurality of units or devices recited in system claims can also be implemented by a unit or a device by software or hardware. The word 'second' is used to denote a name instead of any particular order.

It should be noted that the above embodiments are only for explaining the technical solutions of the present disclosure, and the above embodiments are not intended to be limiting. Although the present disclosure has been described in detail with reference to preferred embodiments, average technician in the field should understand that modifications or equivalent substitutions are departing from the spirits and the scopes of the technical solution of the present disclosure.

I claim:

1. A method for identifying a pseudo wireless access point, applied to an electronic device, comprising:
   determining whether an abnormal file operation is detected, when the electronic device is connected to a wireless network through a wireless access point, the abnormal file operation comprising a new file creation operation for generating a new file, which does not meet preset naming rules, the preset naming rules being configured according to user habits or system settings of the electronic device;
   determining the wireless access point to be a pseudo wireless access point, when the abnormal file operation is detected; and
   executing an early warning instruction, which comprises: prohibiting any operation from accessing a Secure Digital (SD) card in the electronic device.

2. The method for identifying a pseudo wireless access point of claim 1, wherein the file operations comprise one or more of the following: operations corresponding to a target file and a new file creation operation; and
   the target file comprises a file related to user privacy or property security, the operation corresponding to the target file comprises any one or more of the following: a modification operation, a read operation, and a writing operation on the target file.

3. The method for identifying a pseudo wireless access point of claim 2, wherein the abnormal operation comprises one or more of the following:
   an operation to modify permission setting data corresponding to the target file;
   a read operation or a writing operation for reading or writing the target file, which has a file size larger than or equal to a preset value;
   a new file creation operation for generating a new file that does not meet preset naming rules.

4. The method for identifying a pseudo wireless access point of claim 3, wherein the permission setting data comprises:
   access rights, read permissions, editing permissions, modifying permissions.

5. The method for identifying a pseudo wireless access point of claim 1, wherein the early warning instruction comprises one or more of the following:
   logging out of logged-in accounts of all applications in the electronic device;
   freezing operations associated with the target file;
   disconnecting from the wireless access point;
   prompting a user that the wireless access point is the pseudo wireless access point;
   prohibiting any operation from accessing a secure digital card in the electronic device.

6. The method for identifying a pseudo wireless access point of claim 5, comprising:
   disconnecting from the wireless access point after logging out of the logged-in accounts of all the applications in the electronic device.

7. The method for identifying a pseudo wireless access point of claim 1, comprising:
   traversing the file operations according to a preset time interval to determine whether the abnormal file operation is detected.

8. An electronic device, comprising:
   at least one processor; and
   a storage device storing a plurality of instructions, which when executed by the processor, causes the at least one processor to:
   determine whether an abnormal file operation is detected, when the electronic device is connected to a wireless network through a wireless access point, the abnormal file operation comprising a new file creation operation for generating a new file, which does not meet preset naming rules, the preset naming rules being configured according to user habits or system settings of the electronic device;
   determine the wireless access point to be a pseudo wireless access point, when the abnormal file operation is detected; and
   execute an early warning instruction, which comprises: prohibiting any operation from accessing a Secure Digital (SD) card in the electronic device.

9. The electronic device of claim 8, wherein the file operations comprise one or more of the following: operations corresponding to a target file and a new file creation operation; and
   the target file comprises a file related to user privacy or property security, the operation corresponding to the target file comprises any one or more of the following: a modification operation, a read operation, and a writing operation on the target file.

10. The electronic device of claim 9, wherein the abnormal operation comprises one or more of the following:
    an operation to modify permission setting data corresponding to the target file;
    a read operation or a writing operation for reading or writing the target file, which has a file size larger than or equal to a preset value;
    a new file creation operation for generating a new file that does not meet preset naming rules.

11. The electronic device of claim 10, wherein the at least one processor is further caused to:
    disconnect from the wireless access point after logging out of the logged-in accounts of all the applications in the electronic device.

12. The electronic device of claim 8, wherein the early warning instruction comprises one or more of the following:
    logging out of logged-in accounts of all applications in the electronic device;
    freezing operations associated with the target file;
    disconnecting from the wireless access point;
    prompting a user that the wireless access point is the pseudo wireless access point;
    prohibiting any operation from accessing a secure digital card in the electronic device.

13. The electronic device of claim 12, wherein the permission setting data comprises:
    access rights, read permissions, editing permissions, modifying permissions.

14. The electronic device of claim 8, wherein the at least one processor is further caused to:
    traverse the file operations according to a preset time interval to determine whether the abnormal file operation is detected.

15. A non-transitory storage medium having stored thereon instructions that, when executed by a processor of an electronic device, causes the processor of the electronic device to perform a method for identifying a pseudo wireless access point, the method comprising:
    determining whether an abnormal file operation is detected, when the electronic device is connected to a wireless network through a wireless access point, the abnormal file operation comprising a new file creation operation for generating a new file, which does not meet preset naming rules, the preset naming rules being configured according to user habits or system settings of the electronic device;

determining the wireless access point to be a pseudo wireless access point, when the abnormal file operation is detected; and executing an early warning instruction, which comprises: prohibiting any operation from accessing a Secure Digital (SD) card in the electronic device.

16. The non-transitory storage medium according to claim 15, wherein the file operations comprise one or more of the following: operations corresponding to a target file and a new file creation operation; and the target file comprises a file related to user privacy or property security, the operation corresponding to the target file comprises any one or more of the following: a modification operation, a read operation, and a writing operation on the target file.

17. The non-transitory storage medium according to claim 16, wherein the abnormal operation comprises one or more of the following:

an operation to modify permission setting data corresponding to the target file;

a read operation or a writing operation for reading or writing the target file, which has a file size larger than or equal to a preset value;

a new file creation operation for generating a new file that does not meet preset naming rules.

18. The non-transitory storage medium according to claim 16, wherein the permission setting data comprises:

access rights, read permissions, editing permissions, modifying permissions.

19. The non-transitory storage medium according to claim 15, wherein the early warning instruction comprises one or more of the following:

logging out of logged-in accounts of all applications in the electronic device;

freezing operations associated with the target file;

disconnecting from the wireless access point;

prompting a user that the wireless access point is the pseudo wireless access point;

prohibiting any operation from accessing a secure digital card in the electronic device.

20. The non-transitory storage medium according to claim 15, wherein the method further comprises:

traversing the file operations according to a preset time interval to determine whether the abnormal file operation is detected.

* * * * *